UNITED STATES PATENT OFFICE.

AUGUSTE ROBERTI, OF WAREMME, BELGIUM.

MANUFACTURE OF CATTLE FOOD.

1,015,838.  Specification of Letters Patent.  Patented Jan. 30, 1912.

No Drawing.  Application filed June 28, 1911.  Serial No. 635,818.

*To all whom it may concern:*

Be it known that I, AUGUSTE ROBERTI, of Waremme, Liege, in the Kingdom of Belgium, have invented new and useful Improvements in the Manufacture of Cattle Food, for which application has been made in Belgium May 23, 1911; Great Britain, May 29, 1911; France, May 30, 1911; Italy, June 3, 1911; Spain, June 7, 1911; Germany, June 8, 1911; Hungary, June 9, 1911, and of which the following is a specification.

This invention relates to a process of manufacturing dry "molasses-straw" without using a drying kiln, the said process differing completely from ordinary methods of manufacture of this food for cattle.

Molasses-straw is generally obtained simply by causing the molasses to be absorbed in its ordinary state by cut straw or chaff the percentage of molasses to be used being limited by the absorbing power of the said straw. This mixture contains thus about 20-25% of water, and with such a proportion of water it cannot be kept. In order to make it keep well, it is necessary to dry the mixture in some drying apparatus, but as apparatus of that kind are very inefficient, difficult to work, costly to install and yet give a very irregular drying in view of the nature of the product, the product thus obtained cannot be kept satisfactorily or put in sacks.

The process according to this invention does not operate simply by absorption, but by solid incorporation and crystallization of the molasses between the cells in the straw used.

By way of example, the process according to this invention may be carried out in the following manner. On the one hand, the straw is not merely cut up, but ground and shredded, so as to offer to the molasses the greatest possible area of contact and penetration. The straw thus prepared is submitted to high temperature in a suitable apparatus. On the other hand, molasses which is too liquid in its natural state for giving the result desired, is superheated and almost completely dehydrated in a suitable apparatus and thus concentrated and dried to the extent required by the new process. The molasses thus superheated and supersaturated, is projected in the most finely divided drops possible on the straw prepared as hereinbefore stated, in a suitable heater-mixer. The incorporation of the straw takes place at once. A few minutes' stirring is sufficient to insure its complete penetration, and the product escaping from the apparatus becomes dry on cooling to the atmospheric temperature, without further desiccation so that it can be put in sacks immediately after cooling. The straw thus saturated with molasses, contains 8-12% of water according to the point to which the preliminary treatment has been carried. It is thus a dry product obtained without the intervention of a mechanical drying apparatus for dehydrating the impregnated straw after the operation. The process described is therefore entirely different from those generally used heretofore, for molasses-straw. In fact, the molasses in this case, instead of being incorporated in its ordinary state with the straw, is first submitted to a treatment which deprives it of water, supersaturates and superheats it, which treatment is indispensable for obtaining the thorough penetration desired, without the sweating of the liquid molasses out of the straw, so that a dry product is obtained which can be put into sacks and kept. This product is thus obtained directly in a sufficiently dry state, without requiring any subsequent drying. The preliminary treatment of molasses before its incorporation into the straw, leaves to the said molasses only the quantity of water strictly necessary to enable it to become crystallized after penetration into the cells of the straw.

What has been said with reference to straw, is obviously applicable to any other materials that can be used for the manufacture of molasses-products, either peat, forage, chaff, waste grain and seeds, residue of oil mills, malt works, starch works, etc., brewery and distillery wastes.

It is obvious that, without departing from the spirit of the invention, the molasses can be replaced by any other sugar product such as syrup from sugar mills or refineries, raw or purified beetroot or cane juice, and in that way sugared dried straw or similar forage which can be kept for an indefinite time and immediately put into sacks is obtained, by intercellular incorporation and crystallization without the use of a mechanical drier.

The point at which the treatment of molasses or syrup should be stopped, must be determined in each case by practical experience. It varies in fact according (a) to the composition of the molasses or syrup, (b) to the richness in sugar that it is desired to obtain, (c) to the nature of the product employed, (d) to the proportion of water to be obtained for the manufactured product.

Finally, the process described in which it is no longer necessary to take into account the absorbing power of the material used, enables products to be obtained with any proportion of molasses or sugar. This result is very important. It is known in fact that the ordinary process by simple absorption of molasses in its ordinary state necessitated the use of peat-moss as having the maximum power of absorption for the molasses, although the said moss has no feeding value. The process described makes it possible to manufacture dry molasses-straw which can be kept and put into sacks, with 80% of molasses, and more, that is to say, with as great a proportion of molasses as peat, which result cannot be obtained with straw by simple absorption of molasses without preliminary treatment.

If the present process is applied to the peat-moss, instead of straw, 110-120% of molasses in its ordinary state can be used, and a product obtained containing up to 55% of sugar. In that way, a means is obtained for transporting dry molasses in bags or loose without any leaking or sweating, without heating or fermentation, with a reduction of 10-20% on the weight carried, which is of great importance.

I claim—

1. Process for the manufacture of cattle food, which consists in comminuting a suitable absorbent fibrous material, then heating a syrup so as to leave only the quantity of water therein necessary to enable the syrup to become solidified after its subsequent penetration into the cells of the said fibrous material, and then projecting the said heated syrup into contact with said fibrous material so as to cause it to penetrate the cells of the fibrous material, the product becoming dry on cooling to atmospheric temperature, without further desiccation.

2. Process for the manufacture of cattle food, which consists in cutting up, grinding and shredding a suitable absorbent fibrous material, then highly heating a syrup so as to leave only the quantity of water therein strictly necessary to enable the syrup to become solidified after its subsequent penetration into the cells of the said ground fibrous material, and then projecting the said heated syrup in the most finely divided state possible in order to cause it to penetrate the cells of the said fibrous material, the product becoming dry on cooling to atmospheric temperature, without further desiccation.

3. Process for the manufacture of cattle food, which consists in cutting up, grinding and shredding a suitable absorbent fibrous material, then highly heating a syrup so as to leave only the quantity of water therein strictly necessary to enable the syrup to become solidified after its subsequent penetration into the cells of the said ground fibrous material, and then projecting the said heated syrup into contact with said fibrous material so as to cause it to become solidly incorporated therewith and solidified within the cells of the fibrous material, the product becoming dry on cooling to atmospheric temperature, without further desiccation.

4. Process for the manufacture of cattle food, which consists in cutting up, grinding and shredding a suitable absorbent fibrous material, then highly heating molasses so as to leave only the quantity of water therein strictly necessary to enable the molasses to become solidified after its subsequent penetration into the cells of the said ground fibrous material, and then projecting the said heated molasses in a finely divided state into contact with said fibrous material in order to cause it to penetrate the cells of the said fibrous material and become solidly incorporated therewith and solidified within the cells of the fibrous material, the product becoming dry on cooling to atmospheric temperature, without further desiccation.

5. Process for the manufacture of cattle food, which consists in cutting up, grinding and shredding straw, then highly heating a syrup so as to leave only the quantity of water therein strictly necessary to enable the syrup to become solidified after its subsequent penetration into the cells of the said ground straw, and then projecting the said heated syrup in a finely divided state into contact with said ground straw so as to cause it to become solidly incorporated therewith and solidified within the cells of the said straw, the product becoming dry on cooling to atmospheric temperature, without further desiccation.

6. Process for the manufacture of cattle food, which consists in cutting up, grinding and shredding straw, then highly heating molasses so as to leave only the quantity of water therein strictly necessary to enable the molasses to become solidified after its subsequent penetration into the cells of the said ground straw, and then projecting the said heated molasses in a finely divided state into contact with said straw while the latter is also highly heated, in order to cause said molasses to penetrate the cells of the said straw and become solidly incorporated therewith and solidified within the cells of the straw, the product becoming dry on cooling to atmospheric temperature, without further desiccation.

In testimony whereof I affix my signature in presence of two witnesses.

AUGUSTE ROBERTI.

Witnesses:
L. FARETTE,
M. GERBEAULT.